Figure 1:
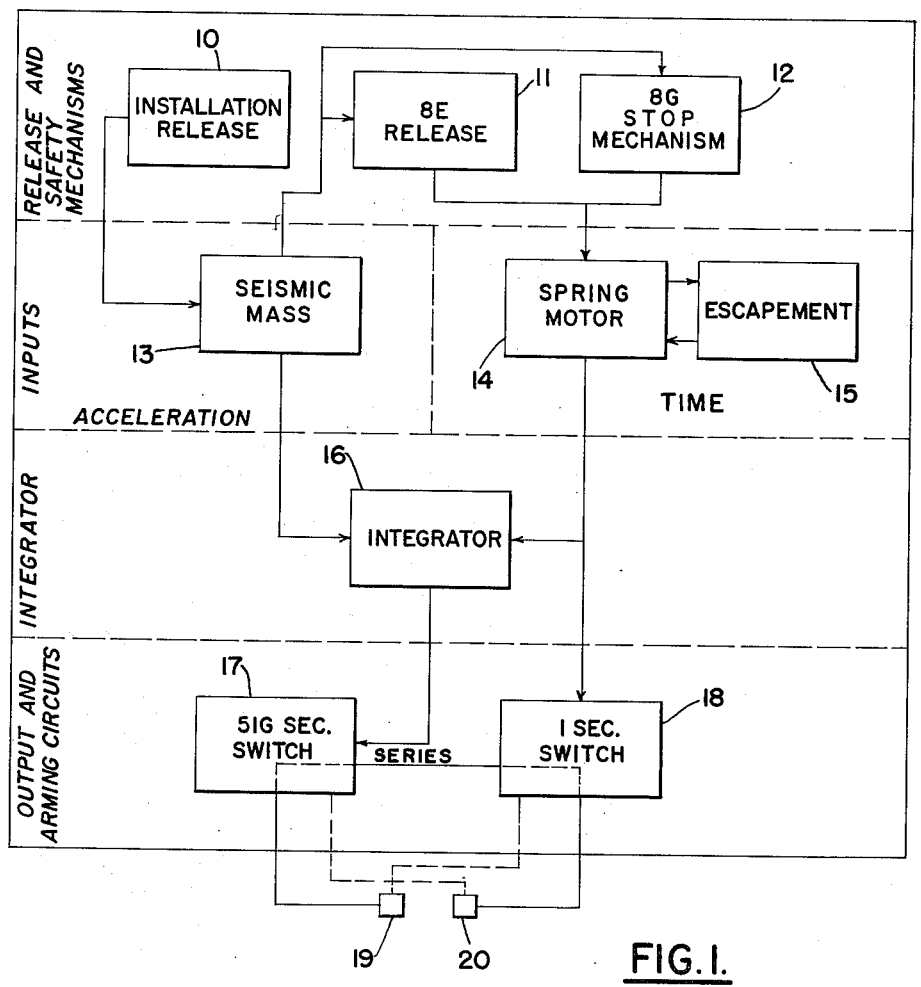

June 29, 1965  M. W. STEWART ETAL  3,192,412
ARMING ACCELEROMETER
Filed May 23, 1961  2 Sheets-Sheet 1

INVENTORS
MERRICK W. STEWART
ROGER K. SMITH
BY
ATTORNEYS:

United States Patent Office 3,192,412
Patented June 29, 1965

3,192,412
ARMING ACCELEROMETER
Merrick W. Stewart, Orlando, Fla., and Roger K. Smith, Rockville, Md., assignors, by mesne assignments, to the United States of America as represented by the Secretary of the Army
Filed May 23, 1961, Ser. No. 112,129
5 Claims. (Cl. 307—121)

The invention described herein may be manufactured and used by or for the Government for governmental purposes without the payment to us of any royalty thereon.

This invention relates to means for arming a moving vehicle such as a projectile, and more especially to an arming device which (1) requires no external source of power, (2) has its operation started altogether in response to a predetermined value of the vehicle's acceleration, and (3) functions to close an arming circuit thereafter when the incremental velocity of the vehicle has attained a predetermined value.

The device utilizes the basic features of an accelerometer, a time delay switch and a velocity meter. The accelerometer is a component of the velocity meter and independently serves to start or stop operations of the velocity meter. The velocity meter is arranged to close a second switch. By connecting the switches in series (parallel) within a circuit, the circuit is closed after both (either) the time delay and (or) the prescribed acceleration-time integral are completed. The integral corresponds to incremental velocity.

The incremental velocity meter consists of an integrator with two input variables and one output variable. The independent input variable which is proportional to time is introduced through the disk of a ball-disk integrator by means of a uniform rotational speed of the disk. The second input variable, the integrand, is introduced through the displacement of the ball of the same integrator. The radial displacement of the ball on the disk is proportional to acceleration and is produced by an accelerometer. The output variable is incremental velocity and is proportional to the rotation of the ball about an axis parallel to the axis of the accelerometer and normal to the plane of the integrator disk.

A constant speed motor drives the disk of the integrator. A given number of turns of the motor closes the time delay switch. The accelerometer shown in the design concept consists of a seismic mass acting against a linear spring. At a prescribed value of acceleration the constant speed motor begins to drive the disk and the time delay mechanism. If, before the completion of the prescribed acceleration-time integral, the acceleration drops below a preset value, the operation of the integrator is stopped. This feature is a safety device.

The design concept of this invention is presented as designed for a particular specification. The values given are for sake of example and are not a requirement of the invention. The scope of the invention is indicated by the appended claims.

Figure 5:
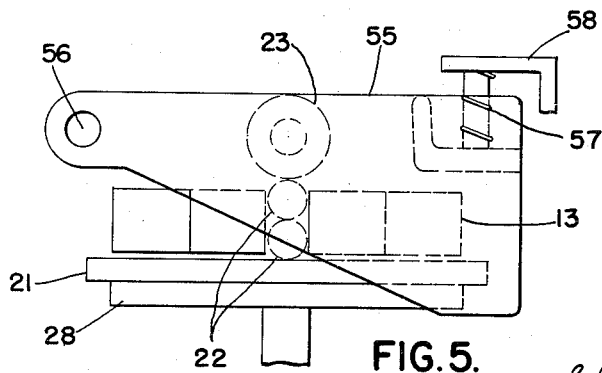
Figure 3:
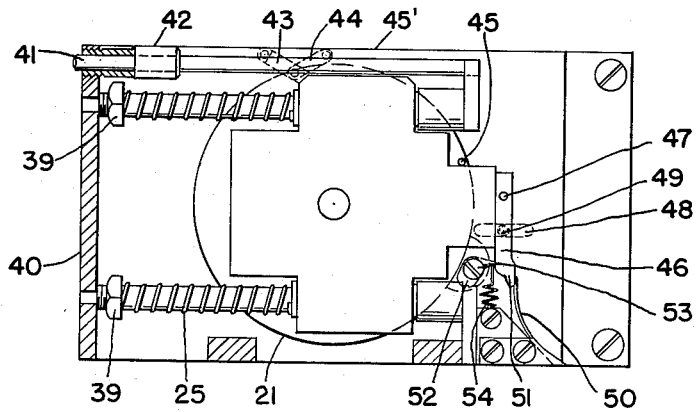
Figure 4:
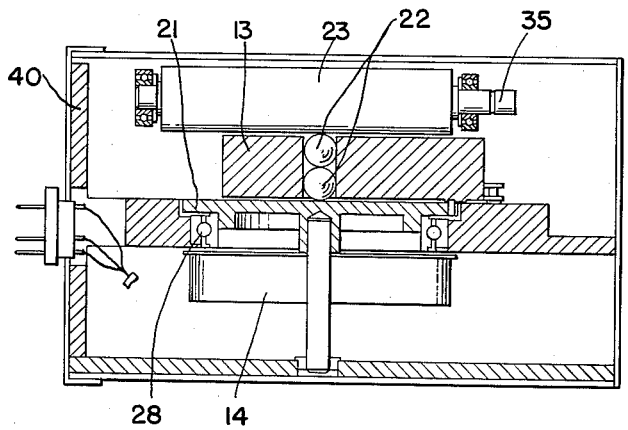
Figure 2:
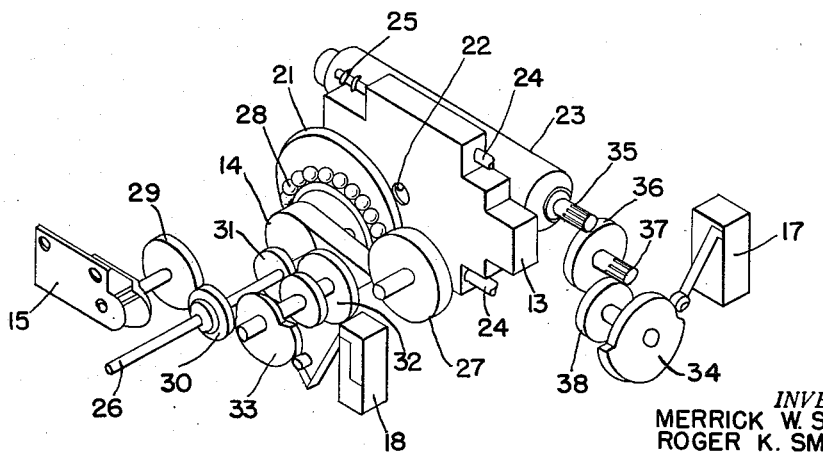

Referring to the drawings:
FIG. 1 is a block diagram indicating the functional relation between the various parts of the device,
FIG. 2 illustrates the mechanical relation between various parts of the device, some of these parts being shown as spaced apart for the sake of clarity,
FIG. 3 is a sectional view of the device showing in particular the relation of the releases 10 and 11 and the mechanism 12 (see FIG. 1) to the other parts of the device,
FIG. 4 shows on an enlarged scale and in somewhat greater detail the mechanical structure of the integrator,
FIG. 5 shows a further detail of the device.

The block diagram of FIG. 1 shows the various parts of the accelerometer as grouped according to the functions which they perform. The release and safety mechanism group includes an installation release 10, an 8G release 11 and 8G stop mechanism 12. The input group includes a seismic mass 13, a spring motor 14 and an escapement 15. The next item is a mechanical integrator 16. The output and arming circuits group includes a switch 17 which is closed at 51G-seconds and a switch 18 which is closed at 1 second. These switches are connected to output terminals 19 and 20.

The installation release 10 is provided to lock the seismic mass in position prior to installation of the accelerometer. It is automatically released when the accelerometer is mounted in the vehicle where it is to function.

Once freed from the release 10, the seismic mass 13 displaces in proportion to axial acceleration against linear spring 25 so that balls or wheels 22 are rotated by disc 21 at a rotational speed which is a function of the axial velocity increment of the instrument. When this acceleration has attained a value of 8G, the release 11 operates to start the spring motor 14 which is controlled by an escapement 15 to drive the integrator 16 at a constant speed. One second after the motor 14 starts, the switch 18 is closed.

With the mass 13 responding to the axial acceleration of the device and the motor 14 rotating at constant speed, one element of the integrator is operated in accordance with time, another of its elements is operated in accordance with the axial acceleration of the device and there is produced at its output a speed which is a measure for the time integration of the acceleration or velocity and functions to close the switch 17 at an acceleration of 51G. Closing of the switch 17 arms the accelerometer by completing a circuit between the terminals 19-20 in series through the switch 18 or in parallel to switch 18 depending upon the requirements of the application.

Should the acceleration of the mass 13 decrease below 8G at any time during this cycle of operation, the release 12 stops the motor 14 thus rendering the accelerometer inoperable.

How these various elements are mechanically related to one another is shown in part by FIG. 2.

As indicated by this figure, the integrator 16 of FIG. 1 includes a disk 21, the mass 13 (shown as spaced from the disk 21 for the sake of clarity), a pair of balls 22 (only one visible) and a drum 23. The mass 13 is movable along a pair of guide rods 24 against springs 25. With the mass 13 in its normal position, the drum 23 is driven by the disk 21 through balls 22 which are positioned along the radius of the disk in accordance with the axial acceleration of the device.

The disk 21 is fixed to a shaft 26 which is driven at a constant speed by the motor 14 and the escapement 15, the motor 14 including a storage drum 27. Sidewise pressure on the disk 21 is taken up in a roller bearing 28.

The escapement 15 is geared to the shaft 26 through gears 29 and 30 and the shaft 26 functions through gears 31 and 32 to drive a cam 33 which operates the switch 18 one second after the motor 14 is put into operation by the 8G release 11.

The 51G switch 17 is operated by a cam 34 which is driven by the drum 23, which is basically a gear, through gears 35 to 38.

From the above description, it can be seen that the mass 13 has a displacement proportional to acceleration, the disk 21 has a displacement which is proportional to time, and these two displacements are combined in the drum 23 to produce a displacement proportional to velocity.

FIG. 3 indicates in greater detail the relation between certain parts of the device. In this figure are shown nuts 39 located near the base 40 of the device and arranged to adjust the zero acceleration point of the integrator ball to the center of the integrator disk.

Extending through the base 40 is a rod 41 which is associated with a bellows 42 for sealing and a link mechanism 43–44, the links 43 and 44 being pivoted together at one of their ends and to the casing 45' and the rod 41 respectively at the other ends. In the illustrated position of the link mechanism, the mass 13 is locked against movement by the inner end of the link 43. Pressure against the outer end of the rod 41, however, straightens the link so that the mass is released for movement.

The release 11 includes a short pin 45 which is fixed to the disk 21 and arranged to engage the edge of the mass 13 until the acceleration of the mass has attained a value of 8G. At this point, the mass has moved downwardly far enough to allow the pin to move past the upper end of the mass.

For stopping the disk 21 in case the acceleration drops below 8G there is provided a mechanism including a lever 46 which is pivoted at 47 and is bifurcated at its opposite end. Mounted between the two legs of the member 46 is a member 48 which is pivoted at 49, is spring biased to the position indicated by the broken lines, and lies between the legs of the member 46 in the illustrated position of the mass 13. The lever 46 is biased to its illustrated position by a spring 50 and has a pin 51 extending between the ends of its legs, a cam 52 pivoted at 53 has its end held in engagement with the pin 51 by a spring 54.

Assuming the device to be resting on its base so that the mass 13 is unlocked and has moved to a point where the disk 21 is released for rotation, the member 48 will assume its broken line position. If the acceleration of the mass now decreases below its minimum value, the mass engages the inner end of the member 48, disengaging the cam 52 from the pin 51 and allowing the spring 54 to rotate the cam to a position where the disk 21 is locked against rotation.

As indicated by FIG. 4, the disk 21 has roller bearings 28 which are arranged to take up the thrust produced by the pressure of the drum 23 on the balls 22. In order that this pressure may be adjusted to the required value, the drum 23 is mounted in a support 55 which is pivoted at 56 and is biased toward the mass 13 by a spring 57 and an adjustable support 58.

While the device has been described as set into operation at an acceleration of 8G and as completing the arming circuit at an acceleration of 51G it will be understood by those skilled in the art that these values are given by way of example, the device being readily adjusted for operation between other limits of acceleration and time.

We claim:

1. In an accelerometer, a constant speed motor, a pair of switches interconnected to complete an arming circuit, an integrator locked against operation in its rest position and arranged to be released in response to a predetermined low value of acceleration for operation by said motor, means responsive to said motor for closing one of said switches at a predetermined time after the operation of said integrator is initiated, and means responsive to a predetermined velocity as well as an acceleration above said predetermined acceleration for closing the other of said switches.

2. The arrangement in accordance with claim 1 having means operable in response to an acceleration below said predetermined acceleration for interrupting the operation of said integrator.

3. The combination of a constant speed motor, and an integrator, said integrator including a drum, a disk coupled to said motor, a gear, gear driving means interposed between said disk and said gear, acceleration responsive means arranged to position said driving means along a radius of said disk, means locking said disk to said acceleration responsive means until a predetermined value of acceleration has been attained, and means responsive to an acceleration below said predetermined acceleration for locking said disk against rotation by said motor.

4. The combination of a constant speed motor, an integrator including a disk coupled to said motor, a gear, gear driving means interposed between said disk and said gear, acceleration responsive means arranged to position said driving means along a radius of said disk, means locking said disk to said acceleration responsive means until a predetermined value of acceleration has been attained, a pair of switches, means responsive to said motor for closing one of said switches at a predetermined time after said value of acceleration is attained, and means responsive to rotation of said gear, for closing the other of said switches at a predetermined axial change of velocity and at an acceleration above said predetermined acceleration.

5. The combination of a constant speed motor, an integrator including a disk coupled to said motor, a drum, drum driving means interposed between said disk and said drum, acceleration responsive means arranged to position said driving means along a radius of said disk, means locking said disk to said acceleration responsive means until a predetermined value of acceleration has been attained, a pair of switches, means responsive to said motor for closing one of said switches at a predetermined time after said value of acceleration is attained, means responsive to rotation of said drum for closing the other of said switches at a predetermined axial change of velocity and at an acceleration above said predetermined acceleration, and means interconnecting said switches to complete an arming circuit.

References Cited by the Examiner
UNITED STATES PATENTS

| | | | |
|---|---|---|---|
| 2,496,310 | 2/50 | Rabinow | 307—120 |
| 2,872,538 | 2/59 | McLean | 102—78 |
| 3,012,157 | 12/61 | Baring et al. | 307—120 |
| 3,125,958 | 3/64 | Foure | 102—78 |

LLOYD McCOLLUM, *Primary Examiner.*

MILTON O. HIRSHFIELD, *Examiner.*